United States Patent [19]

Pfeiffer et al.

[11] Patent Number: 4,537,626
[45] Date of Patent: Aug. 27, 1985

[54] METHOD FOR THE PRODUCTION OF REACTION GASES

[75] Inventors: Roland Pfeiffer, Cologne; Heinz-Dieter Waldhecker, Bergisch Gladbach, both of Fed. Rep. of Germany

[73] Assignee: Klöckner-Humboldt-Deutz AG, Fed. Rep. of Germany

[21] Appl. No.: 551,919

[22] Filed: Nov. 15, 1983

Related U.S. Application Data

[63] Continuation-in-part of Ser. No. 279,437, Jul. 1, 1981, abandoned.

[30] Foreign Application Priority Data

Jul. 2, 1980 [DE] Fed. Rep. of Germany ....... 3024977

[51] Int. Cl.$^3$ ............................................. C22B 5/12
[52] U.S. Cl. ..................... 75/35; 48/197 R; 75/91
[58] Field of Search ............... 75/33, 34, 35, 38, 91; 48/197 R

[56] References Cited

U.S. PATENT DOCUMENTS

| | | | |
|---|---|---|---|
| 1,592,863 | 7/1926 | Leonarz | 75/91 |
| 3,460,934 | 8/1969 | Kelmar | 75/42 |
| 3,853,538 | 12/1974 | Nemeth | 75/35 |
| 3,884,677 | 5/1975 | Wenzel et al. | 75/91 |
| 4,008,074 | 2/1977 | Rossner et al. | 75/46 |
| 4,223,876 | 9/1980 | Weigel et al. | 266/156 |
| 4,238,226 | 12/1980 | Sanzenbacher et al. | 75/38 |

FOREIGN PATENT DOCUMENTS 2078779  1/1982  United Kingdom ............... 75/29

Primary Examiner—Melvyn J. Andrews
Attorney, Agent, or Firm—Hill, Van Santen, Steadman & Simpson

[57] ABSTRACT

A method for the production of reaction gases consisting essentially of carbon monoxide and hydrogen in which reactants including a carbonaceous source, slag formers and an oxygen-containing gas are directed in the form of jets through nozzles under the surface of a molten metal bath in a reactor to produce said reaction gases. These reaction gases are then passed to a metallurgical reduction reactor wherein exhaust gases are produced containing carbon dioxide, carbon monoxide, water vapor and hydrogen. In accordance with the present invention, at least a portion of the exhaust gases from the metallurgical reduction reactor are recycled into heat exchange relationship with nozzles in the reactor to cool the same. The invention also contemplates recycling additional portions of the exhaust gases to combine them with the oxygen-containing gas entering the reactor, and to serve as a suspending medium for the carbonaceous source or the slag formers.

8 Claims, 1 Drawing Figure

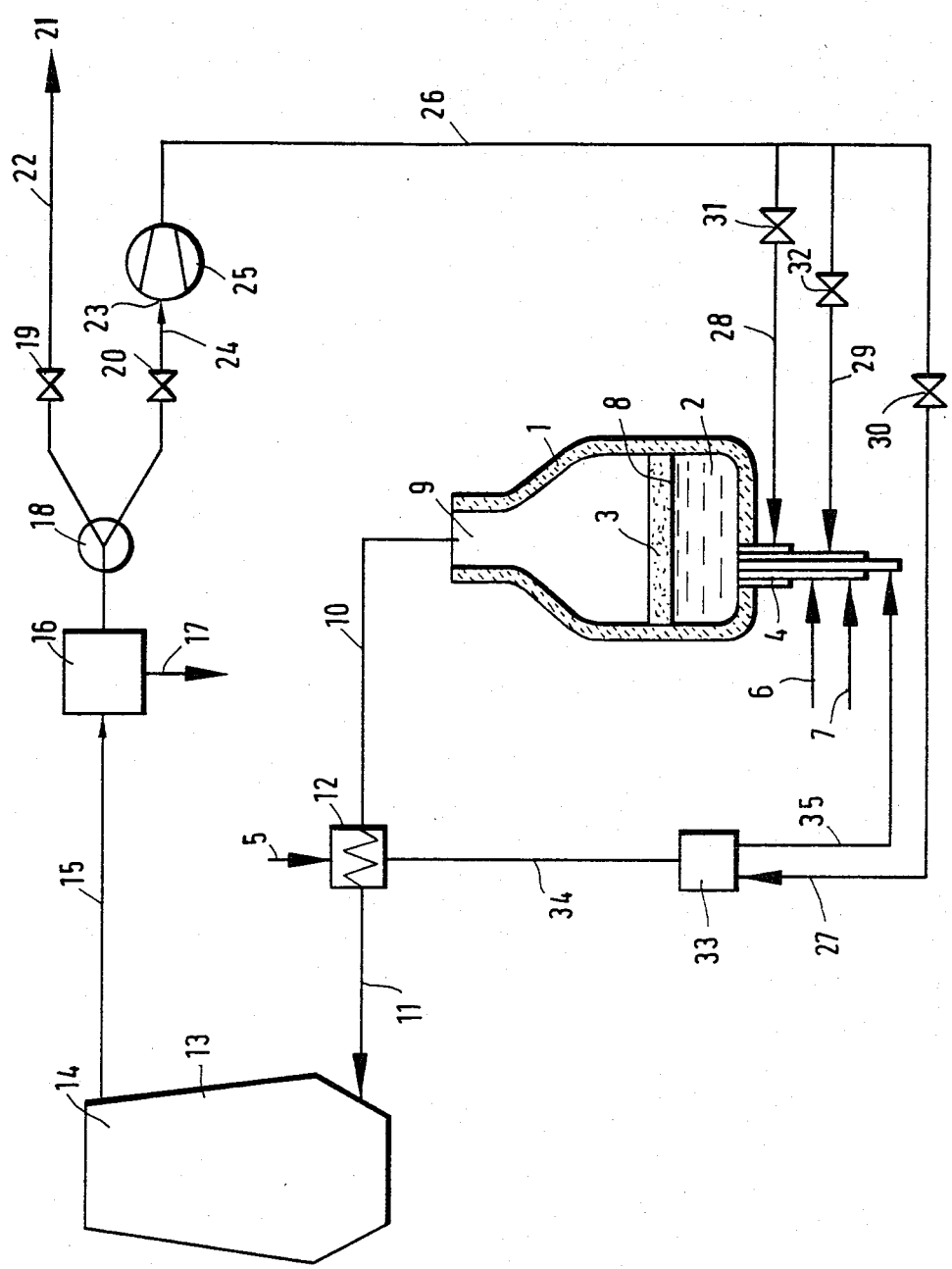

4,537,626

METHOD FOR THE PRODUCTION OF REACTION GASES

CROSS-REFERENCE TO RELATED APPLICATION

This application is a continuation-in-part of our Ser. No. 279,437, filed July 1, 1981, now abandoned.

BACKGROUND OF THE INVENTION

1. Field of the Invention

The present invention is in the field of producing reaction gases and utilizing the reaction gases in metallurgical reduction processes. The specific improvement of the present invention involves recycling at least a portion of the exhaust gases from the metallurgical reduction process back into the original reactor to serve as a coolant gas for the nozzles in the reactor.

2. Description of the Prior Art

This invention relates to a method for the production of reaction gases by means of gasification of solid, liquid, or gaseous carbonaceous sources by means of a molten metal bath into which the carbonaceous sources, slag formers, and oxygen or an oxygen-containing gas used as a suspending medium are blown in through one or more jets below the surface of the molten metal and are converted into a reaction gas consisting essentially of CO and $H_2$. These reaction gases are further supplied in a separate process stage to a metallurgical reduction wherein such reaction gases are oxidized to produce some $CO_2$ and $H_2O$, while retaining some residual CO and $H_2$.

In the use of reaction gases consisting essentially of CO and $H_2$, particularly in the field of metallurgical reduction processes as in the direct reduction of iron ores in a reduction furnace, the reduction gases are brought into contact with the iron ore to be reduced at temperatures of approximately 1000° C. During the reaction, the reduction gases are essentially utilized only up to about 40% which means that the exhaust gases leaving the reduction stack still contain significant amounts of CO and $H_2$ as well as the $CO_2$ and $H_2O$ formed by the oxidation processes. These exhaust gases which still contain usable amounts of CO and $H_2$ have either been subsequently burned to recover the sensible heat or they were utilized together with natural gas in a fission reactor to serve as a medium for the decomposition of methane gas. Another use for the exhaust gases involves washing the exhaust gases from the reduction stack to remove carbon dioxide and a further removal of the water, followed by a recycle of the remaining gases to the reduction stage for reducing iron ore. Such possibilities of utilizing the exhaust gases from the metallurgical reduction process are, however, for the most part unsatisfactory from the standpoint of energy usage and economy.

In the case of one known method, described in German AS No. 2,401,909 for the production of steel from finely granular iron ores, solid carbon carriers, lime, slag formers, oxygen, and sponge iron are introduced into a metal melt by means of multi-jacket jets arranged under the bath surface in direct proximity to one another. The reaction gases generated in the iron bath reactor are used for pre-reduction whereby the exhaust gases produced upon oxidation, particularly $CO_2$ and $H_2O$ are supplied to a combustion chamber for post-combustion and their residual heat is utilized by means of heat exchange. A particular disadvantage in the case of this method is that the exhaust gas is utilized only indirectly in a conventional manner with heat exchangers, and is not used directly for the production of additional reaction gases. In addition, in this particular method, there is a high oxygen consumption.

In German OS No. 2,710,106 there is described a method for the generation of liquid pig iron in a blast furnace wherein iron oxide is reduced by means of CO and $H_2$. These reaction gases are generated separately from the blast furnace in an iron bath reactor by means of gasification of heavy oil with oxygen. The exhaust gases from the blast furnace according to this method are subjected to dust removal as well as a pressure wash to remove portions of the $CO_2$ and $H_2O$. The gas cleaned in this manner is preheated and again directly supplied to the blast furnace. The pressure wash required for this process is expensive and also causes problems in the operating process. Further, it influences in a negative way the availability of the total plant.

In U.S. Pat. No. 4,238,226 there is described a method and apparatus for reducing particulate iron oxide and producing molten iron wherein coal and oxygen and injected into a molten iron bath to melt the iron, gasify the coal and produce a hot gas which is used as a reducing agent in a counterflow shaft furnace to reduce iron oxide pellets and/or natural ore in a continuous manner. The hot reduced iron product from the shaft furnace is discharged directly into the molten iron bath from which the molten iron product is discharged.

SUMMARY OF THE INVENTION

The present invention provides an improved method making possible an improved utilization of the available heat, as well as a simplified apparatus. The process lends itself to optimum regulation and provides a relatively lower cost because of the reduced oxygen requirement.

In accordance with the present invention, the exhaust gas which is the incompletely oxidized reaction product in the metallurgical reduction stage is returned to the reactor, preferably after dust removal and cooling, to serve as a cooling medium for the nozzles which inject the reactants into the reactor. By means of this process, the service life of the jets can be increased over what was heretofore considered normal.

Additionally, another protion of the exhaust gases from the metallurgical reduction reactor can be added to the oxygen-containing gas entering the reactor. As a further alternative, an additional portion of the exhaust gases can be used to suspend the carbonaceous source or the slag formers being fed into the reactor.

In a preferred form of the invention, the exhaust gases prior to their re-use in the reactor are cooled to a temperature of about 25° to 50° C. The molten metal bath temperature is in the range from about 1300° to 1700° C.

BRIEF DESCRIPTION OF THE DRAWING

The single FIGURE in the drawing illustrates somewhat schematically a reactor gas producing plant employing features of the present invention.

DESCRIPTION OF THE PREFERRED EMBODIMENTS

A plant for carrying out the method of the present invention may include a metal bath reactor 1, for example, a molten iron bath reactor, containing molten iron 2 and an overlying slag layer 3. The floor of the reactor is provided with one or more multi-jacket jets 4. A source of carbonaceous material is introduced through a line 5 and slag formers, for example, including lime can be introduced through an inlet line 6. A gasification medium such as oxygen or an oxygen-containing gas is introduced through an inlet line 7 underneath the bath surface into the molten metal 2.

The reaction gas produced in the reactor is withdrawn through the reactor neck 9 and proceeds by means of conduits 10 and 11 separated by a heat exchanger 12 into a reaction gas consuming device 13. The purpose of the heat exchanger 12 is to adjust the temperature of the gas to that required for the efficient operation of the gas consuming device 13, and also to preheat the carbonaceous source entering through the line 5.

The gas-consuming device 13 may, for example, be a blast furnace for the generation of iron sponge from iron ore. It may also consist of a combustion reactor or a gas turbine with pre-connected or post-connected combustion of the reaction or combustion gases. Gases formed in the device 13 are conducted from the outlet end 14 of the metallurgical reduction reactor. These gases contain substantial amounts of $CO_2$ and $H_2O$, as well as residual CO and $H_2$. The exhaust gases are conducted by means of a conduit 15 into a dust remover 16 such as a cyclone separator in which coarse dust is removed through a discharge line 17. The exhaust gas which has been cleaned in the dust remover 16 is fed to a dividing device 18 which feeds two branched lines containing regulating valves 19 and 20. Residual exhaust gas is shown being directed to a separate part of the plant 21 through a line 22. Such gas may be used, for example, for post-combustion or preheating of the coal dust. It can also be used for the preheating of the oxygen-containing gas or for preheating the slag formers.

A partial stream of the exhaust gas is directed into the inlet 23 of a compressor 25 by means of an inlet conduit 24. The compressed partial gas flow is then directed through a conduit 26. A portion of the exhaust gases in conduit 26 is directed through a flow regulating valve 31 into a conduit 28 which directs the gases into heat exchange relationship with the nozzles 4.

The effect of the exhuast gases as a coolant on the nozzle openings is based essentially on the two highly endothermic reactions which occur:

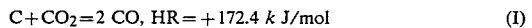

$$C + CO_2 = 2\ CO,\ HR = +172.4\ k\ J/mol \quad (I)$$

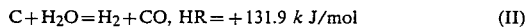

$$C + H_2O = H_2 + CO,\ HR = +131.9\ k\ J/mol \quad (II)$$

In addition to the high heat consumption of reactions I and II, the formation of $H_2$ is also highly beneficial for a cooling effect at the nozzles, since the particularly good thermal conduction properties of $H_2$ provide a rapid heat dissipation into the metal bath.

An additional portion of the gas can be directed through a conduit 27 and regulating valve 30 into a storage feed chamber 33 where it is combined with the preheated carbonaceous source material from the heat exchanger 12. The suspended mixture of carbonaceous source and exhaust gases is then directed pneumatically to the metal bath reactor 1 by means of a conduit 35.

Another portion of the exhaust gases in conduit 26 can be directed through a regulating valve 32 into a conduit 29 to be combined with the oxygen-containing gas entering the reactor through the conduit 7.

The exhaust gases delivered back to the reactor by means of the line 26 have a temperature preferably in the range from 25° to 50° C. The temperature of the molten bath 2 may range from about 1300° to 1700° C. in the case of iron.

In a preferred form of the invention, 50 to 65% of the exhaust gases in conduit 26 are recycled to cool the nozzles. Another 10 to 25% of the exhaust gases are combined with the oxygen-containing gas and 15 to 35% of the gases are used to suspend the carbonaceous source therein.

EXAMPLE

The following is a typical example of operation under the process of the present invention. The reaction gas produced in the metal bath reactor 1 typically has a composition of 68.71% CO, 29.93% $H_2$, and 1.36% of other gases at a temperature of 1400° C. which is substantially the bath temperature. The exhaust gas leaving the metallurgical reduction reactor 13 has a temperature of about 300° C. and has a gas composition of 40.4% CO, 17.6% $H_2$, 28.35% $CO_2$, 12.35% $H_2O$, and 1.3% other gases. The recycled gas has the same composition at a temperature of about 25° to 50° C. About 57% is employed as a cooling gas in the conduit 28 and 18% is employed in the oxygen line 29. About 25% of the recycled gas is combined with the carbonaceous source and appears in the conduit 35.

The recycle of the gas leads to a resulting fuel saving of about 15.2% because the amount of coal to be employed amounts to about 600 kg per ton of iron, whereas without the recycle it would amount to about 720 kg per metric ton of Fe.

It should be evident that various modifications can be made to the described embodiments without departing from the scope of the present invention.

We claim as our invention:

1. In a method for the production of reaction gases consisting essentially of CO and $H_2$ in which reactants including a carbonaceous source, slag formers and an oxygen-containing gas are directed in the form of jets through nozzles under the surface of a molten metal bath in a reactor to produce said reaction gases, and said reaction gases are passed to a metallurgical reduction reactor wherein exhaust gases are produced containing $CO_2$, CO, $H_2O$ and $H_2$, the improvement which comprises:

recycling at least a portion of said exhaust gases into heat exchange relationship with said nozzles in said reactor to cool the same.

2. A method according to claim 1 which includes the step of:

recycling an additional portion of said exhaust gases and adding the recycled portion to the oxygen-containing gas entering said reactor.

3. A method according to claim 1 which includes the steps of:

recycling an additional portion of said exhaust gases, suspending said carbonaceous source in the recycled portion, and passing the resulting suspension into said molten metal bath.

4. A method according to claim 1 which includes the step of:

removing dust and cooling said exhaust gases prior to recycling said exhaust gases back to said reactor.

5. A method according to claim 4 in which said exhaust gases are cooled to a temperature of about 25° to 50° C.

6. A method according to claim 1 in which:

said molten metal bath temperature is in the range from about 1300° to 1700° C.

7. A method according to claim 1 which includes the steps of:
recycling an additional portion of said exhaust gases and adding the recycled portion to the oxygen-containing gas entering said reactor, and
recycling a further portion of said exhuast gases, suspending said carbonaceous source in the recycled portion and passing the resulting suspension into said molten metal bath.

8. A method according to claim 7 in which a partial stream of said exhaust gases is utilized as follows:
50 to 65% of the recycled exhaust gases are recycled to said nozzles,
10 to 25% of the recycled exhaust gases are combined with said oxygen-containing gas, and
15 and 35% of the recycled exhaust gases are used to suspend the carbonaceous source therein.

* * * * *